(12) United States Patent
Aguilar, Jr. et al.

(10) Patent No.: US 7,290,112 B2
(45) Date of Patent: Oct. 30, 2007

(54) SYSTEM AND METHOD FOR VIRTUALIZATION OF PROCESSOR RESOURCES

(75) Inventors: Maximino Aguilar, Jr., Austin, TX (US); Michael Norman Day, Round Rock, TX (US); Mark Richard Nutter, Austin, TX (US); James Xenidis, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 10/955,093

(22) Filed: Sep. 30, 2004

(65) Prior Publication Data

US 2006/0069878 A1 Mar. 30, 2006

(51) Int. Cl.
*G06F 12/00* (2006.01)
(52) U.S. Cl. .................. 711/202; 711/162; 711/161; 711/203
(58) Field of Classification Search ................ 711/202
See application file for complete search history.

(56) References Cited

U.S. PATENT DOCUMENTS

| 6,003,065 | A | 12/1999 | Yan et al. .................... 709/201 |
| 6,075,938 | A | 6/2000 | Bugnion et al. ............... 703/27 |
| 6,128,724 | A | 10/2000 | Lee et al. ..................... 712/32 |
| 6,381,659 | B2 | 4/2002 | Proch et al. ................... 710/57 |
| 6,526,491 | B2 | 2/2003 | Suzuoki et al. ............. 711/164 |
| 6,559,854 | B2 | 5/2003 | Oka et al. .................... 345/619 |
| 6,647,508 | B2 | 11/2003 | Zalewski et al. ............... 714/3 |
| 2001/0002130 | A1 | 5/2001 | Suzuoki ..................... 345/420 |
| 2002/0046229 | A1 | 4/2002 | Yutaka et al. ................ 709/102 |
| 2002/0060690 | A1 | 5/2002 | Tanaka et al. .............. 345/619 |
| 2002/0062434 | A1 | 5/2002 | Chauvet et al. ............. 711/207 |
| 2002/0095523 | A1 | 7/2002 | Shimakawa et al. ........ 709/316 |
| 2002/0135582 | A1 | 9/2002 | Suzuoki et al. ............. 345/502 |
| 2002/0138637 | A1 | 9/2002 | Suzuoki et al. ............. 709/230 |
| 2002/0138701 | A1 | 9/2002 | Suzuoki et al. ............. 711/154 |
| 2002/0138707 | A1 | 9/2002 | Suzuoki et al. ............. 711/163 |
| 2002/0156984 | A1 * | 10/2002 | Padovano .................... 711/148 |
| 2002/0156993 | A1 | 10/2002 | Suzuoki et al. ............... 712/30 |
| 2003/0055984 | A1 | 3/2003 | Shimakawa et al. ........ 709/316 |
| 2004/0088710 | A1 | 5/2004 | Ronkka et al. ............. 718/107 |
| 2005/0240740 | A1 * | 10/2005 | Takeda et al. .............. 711/162 |

\* cited by examiner

*Primary Examiner*—Sanjiv Shah
*Assistant Examiner*—Jae Un Yu
(74) *Attorney, Agent, or Firm*—Van Leeuwen & Van Leeuwen; D'Ann N. Rifai (57) ABSTRACT

A system and method for virtualization of processor resources is presented. A thread is created on a processor and the processor's local memory is mapped into an effective address space. In doing so, the processor's local memory is accessible by other processors, regardless of whether the processor is running. Additional threads create additional local memory mappings into the effective address space. The effective address space corresponds to either a physical local memory or a "soft" copy area. When the processor is running, a different processor may access data that is located in the first processor's local memory from the processor's local storage area. When the processor is not running, a softcopy of the processor's local memory is stored in a memory location (i.e. locked cache memory, pinned system memory, virtual memory, etc.) for other processors to continue accessing.

14 Claims, 11 Drawing Sheets

SYSTEM AND METHOD FOR VIRTUALIZATION OF PROCESSOR RESOURCES

BACKGROUND OF THE INVENTION

1. Technical Field

The present invention relates in general to a system and method for virtualization of processor resources. More particularly, the present invention relates to a system and method for virtualizing processor memory such that one or more threads may access the processor memory, regardless of a processor's state.

2. Description of the Related Art

Computer systems are becoming more and more complex. The computer industry typically doubles the performance of a computer system every 18 months (e.g. personal computer, PDA, gaming console). In order for the computer industry to accomplish this task, the semiconductor industry produces integrated circuits that double in performance every 18 months. A computer system uses integrated circuits for particular functions based upon the integrated circuits' architecture. Two fundamental architectures are 1) microprocessor-based and 2) digital signal processor-based.

An integrated circuit with a microprocessor-based architecture is typically used to handle control operations whereas an integrated circuit with a digital signal processor-based architecture is typically designed to handle signal-processing manipulations (i.e. mathematical operations). As technology evolves, the computer industry and the semiconductor industry realize the importance of using both architectures, or processor types, in a computer system design.

Many computer systems use a multi-processor architecture in order to provide a substantial amount of processing power while attempting to support a wide range of software applications. A challenge found, however, is that each of these processors includes dedicated internal memory that is not accessible by other processors, such as a local storage area and register files. Another challenge found is that if a particular processor is unavailable, other processors may not access data from the unavailable processor.

Furthermore, a processor may run multiple threads that access the same memory space. A challenge found is that when a particular thread is accessing a particular memory space, the other threads must wait until the particular thread is complete before the other threads are able to access the memory space.

What is needed, therefore, is a system and method to virtualize processor memory resources such that the resources are concurrently accessible by one or more threads, regardless of a processor's state.

SUMMARY

It has been discovered that the aforementioned challenges are resolved by mapping a processor's local memory into an effective address space for each thread that an application creates, and using a page table entry for each thread in which an address translator accesses in order to determine whether to retrieve a "soft" data copy for the thread to process. For each thread that an application creates, an operating system stores a page table entry in a page table that includes an effective address and a real address. The real address corresponds to either a local storage location or a soft copy area. When an address translator receives a request from the thread to retrieve data, the address translator looks-up the page table entry and retrieves the data from the real address location.

A first processor includes an operating system whereby the operating system may be a real-time operating system (e.g. a gaming operating system) or a virtual operating system (e.g. a web-browsing operating system). The operating system invokes a thread for a particular application. The thread is responsible for performing particular tasks, such as terrain rendering for a gaming application. When the operating system invokes the thread, the operating system sends a page table entry to a page table. The page table entry includes an effective address and a real address that corresponds a location of data that the thread utilizes. The real address may correspond to a physical local memory location (e.g. local store), or the real address may correspond to a soft copy area. For example, the soft copy area may be in cache, pinned system memory, or disk.

The thread sends a request that includes an effective address to an address translator. The effective address indicates the effective memory location of data that the thread wishes to access. The address translator receives the request, and looks-up a page table entry in the page table whereby the address translator identifies the real address that corresponds to the effective address. If the real address corresponds to a processor's local storage area, the address translator retrieves the data from the processor's local storage area and passes the data to the thread. If the real address corresponds to a soft copy area, the address translator retrieves a copy of the data from the soft copy area and passes the data copy to the thread.

The operating system manages the thread's data by saving and restoring the data to and from the soft copy area based upon particular policies and the state of a corresponding processor. In particular instances, such as when a processor's memory is being utilized by multiple threads, the operating system may create soft copies of the local store for each thread whereby the threads utilize different soft copies. The operating system creates a new page table entry in the page table each time the operating system performs a save or restore operation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
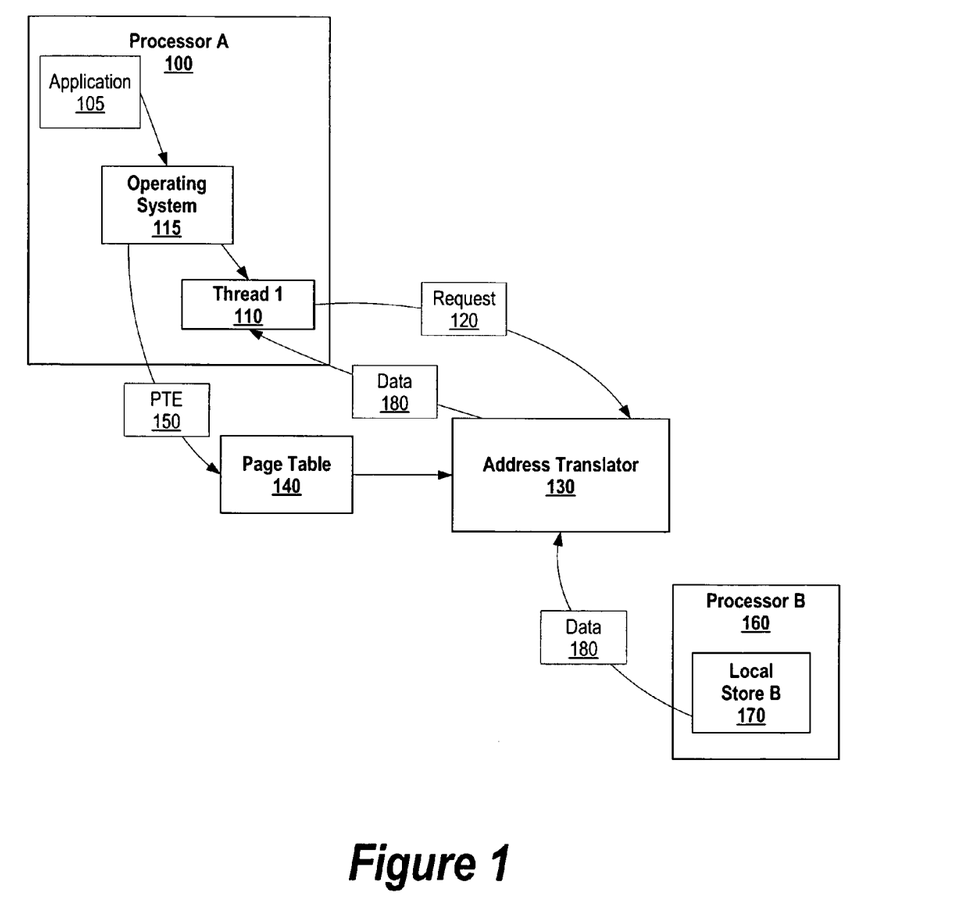
FIG. 1 is a diagram showing a main processor accessing a secondary processor's local memory.

FIG. 1 is a diagram showing a main processor accessing a secondary processor's local memory. Processor A 100 is a main processor that includes operating system 115. Operating system 115 may be a real-time operating system, such as a gaming operating system, or operating system 115 may be a virtual operating system, such as a web-browsing operating system.

Operating system 115 receives a thread request from application 105, whereby operating system 115 invokes thread 1 110. Thread 1 110 is responsible for performing particular tasks, such as terrain rendering in a gaming application. When operating system 115 invokes thread 1 110, operating system 115 sends page table entry 150 to page table 140. Page table entry 150 includes an effective address and a real address that corresponds to data location that thread 1 110 utilizes. The real address may correspond to a physical local memory location (e.g. local store), or the real address may correspond to a soft copy area. For example, a soft copy of the data may be stored in cache, pinned system memory, or disk (see FIG. 4 and corresponding text for further details regarding physical local memory and soft copy areas.

Thread 1 110 sends request 120 to address translator 130 requesting access to a particular portion of memory. Request 120 includes an effective address that indicates the effective memory location of data that thread 1 110 wishes to access. Address translator 130 receives request 120, and looks-up page table entry 150 in page table 140. Address translator 130 identifies that the real address location is a located on processor B 160's local store B 170. Address translator 130 retrieves data 180 from local store B 170, and sends data 180 to thread 1 110. In one embodiment, address translator 130 incrementally sends data 160 to thread 1 110, such as on a page-by-page basis. In one embodiment, a thread may reside on processor B 160 whereby the thread retrieves data from processor A 100's local store (see FIG. 2 and corresponding text for further details regarding threads residing on processor B 160).

Figure 2:
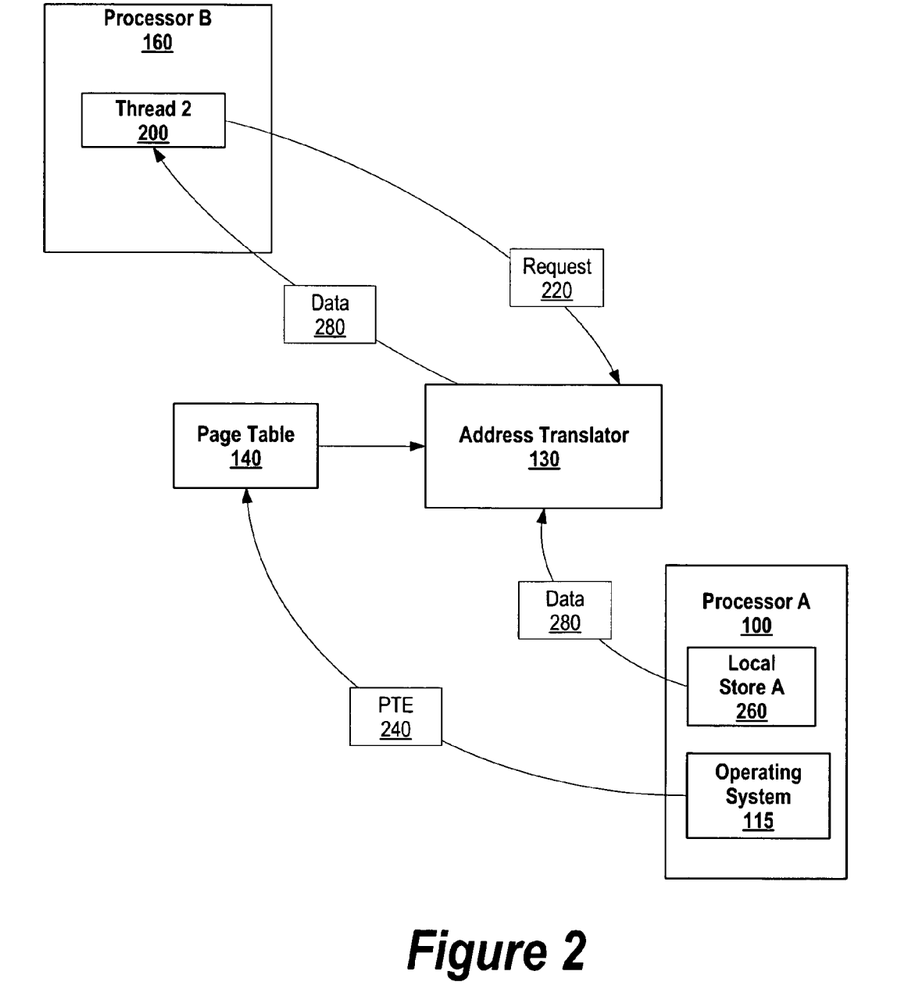
FIG. 2 is a diagram showing a thread that is included on a secondary processor accessing a main processor's local memory.

FIG. 2 is a diagram showing a thread that is included on a secondary processor accessing a main processor's local memory (e.g. local store). FIG. 2 is similar to FIG. 1 with the exception that processor B 160 includes a thread that requests data from processor A 100's local memory, such as local store A 260.

Processor A 100 includes operating system 115, whereby, when operating system 115 invokes thread 200, operating system 115 sends page table entry 240 to page table 140. Page table entry 240 includes an effective address and a real address that corresponds to a data location that thread 200 utilizes.

Thread 2 200 sends request 220 to address translator 130. Address translator 130 looks-up page table entry 240, and determines that the data is located in local store A 260. Address translator 130 retrieves data 280 from local store 260, and provides data 280 to thread 2 200. Address translator 130, page table 140 processor B 160, processor A 100, and operating system 115 are the same as that shown in FIG. 1.

Figure 3:
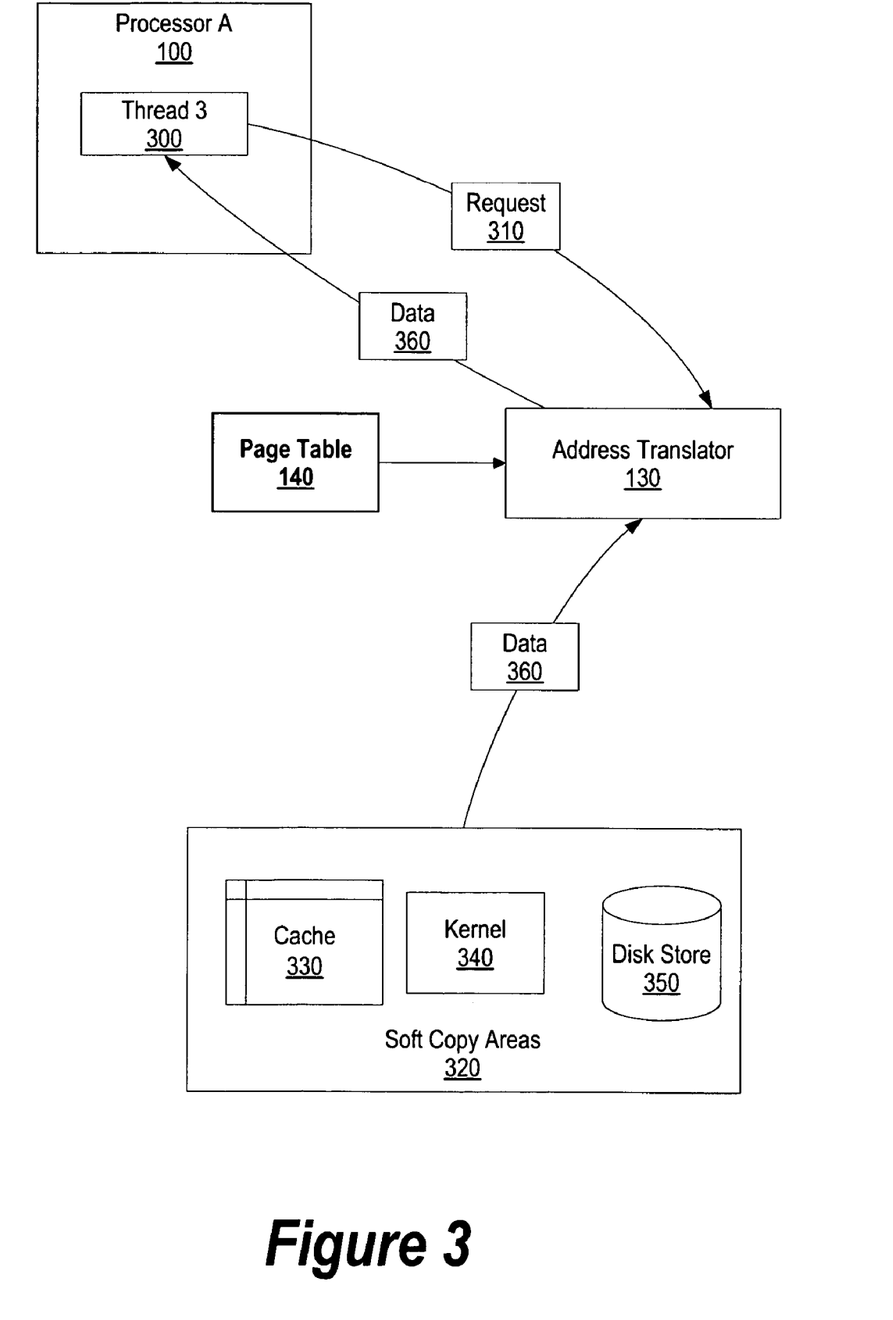
FIG. 3 is a diagram of a thread accessing a soft copy of a processor's local memory that is located in a soft copy area.

FIG. 3 is a diagram of a thread accessing a soft copy of a processor's local memory that is located in a soft copy area. During operation, an operating system saves and restores physical memory to soft copy areas based upon policy information. For example, an operating system may save and restore data at particular time intervals (see FIG. 6 and corresponding text for further details). When data is swapped from a local store to a soft copy area, the operating system changes a page table entry in page table 140 such that address translator 130 retrieves the data from the correct soft copy area.

Processor A 100 includes thread 3 300, which sends request 310 to address translator 130. In turn, address translator 130 identifies a page table entry in page table 140, and determines that the data is located in a soft copy area, such as soft copy areas 320. Soft copy areas 320 include cache 330, kernel 340, and disk store 350. Cache 330 may be an L1 or L2 cache, kernel 340 may be pinned system memory, and disk store 350 may be an external hard drive.

Address translator 130 retrieves data 360 from soft copy areas 320, and provides data 360 to thread 3 300 for further processing. Address translator 130, page table 140, and processor A 100 are the same as that shown in FIG. 1.

Figure 4:
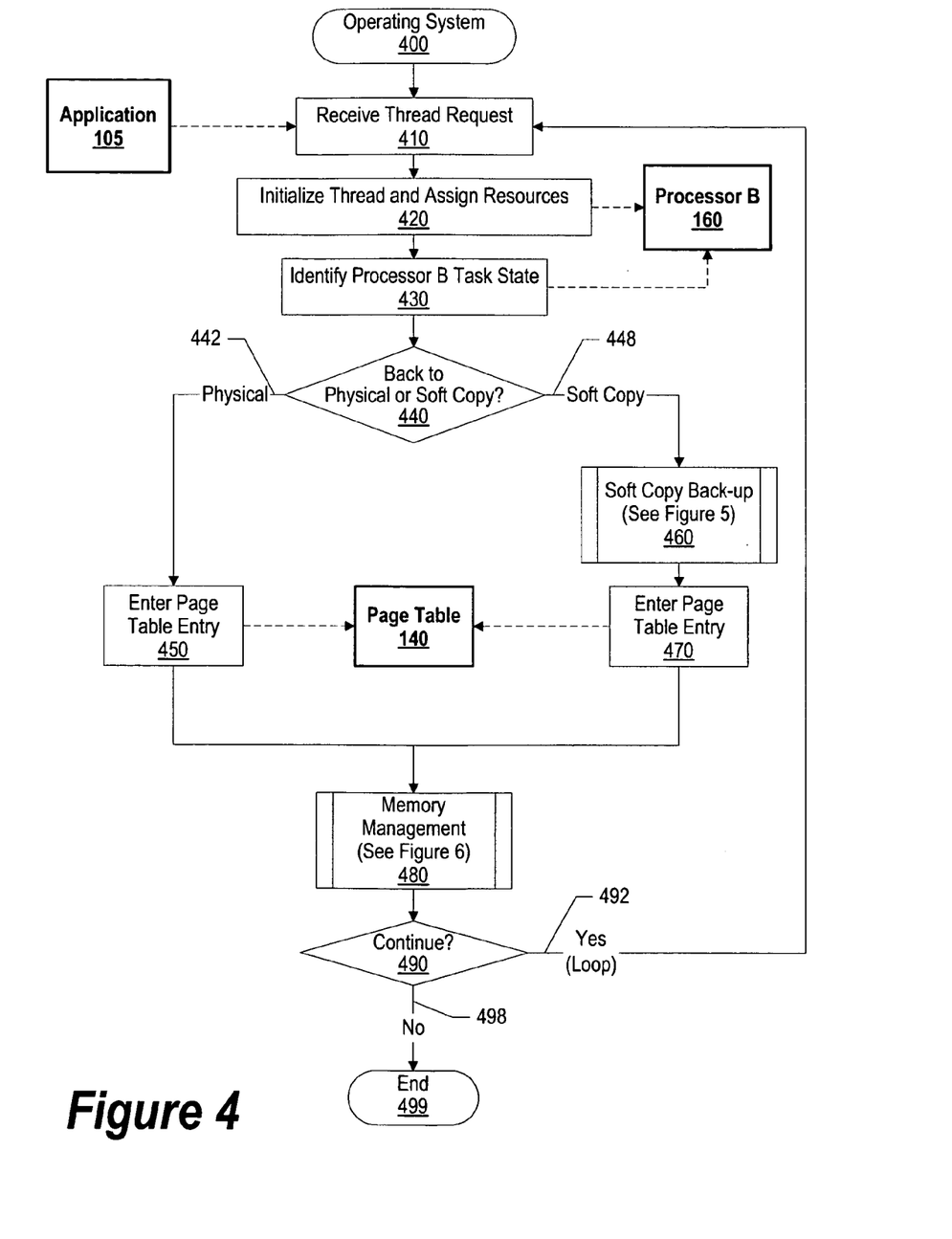
FIG. 4 is a high-level flow chart showing steps taken in an operating system managing processor memory based upon one or more threads.

FIG. 4 is a high-level flow chart showing steps taken in an operating system managing processor memory based upon one or more threads. Processing commences at 400, whereupon the operating system receives a thread request from application 105 (step 410). For example, application 105 may wish to invoke a thread that performs complex computations, such as terrain rendering. The operating system initializes a thread at step 420 whereby the operating system identifies resources to support the thread, such as processor B 160. Application 105 and processor B 160 are the same as that shown in FIG. 1.

A step 430, processing identifies processor B 160's task state. For example, if a thread requires data from a particular processor's local memory, the operating system identifies whether the same processor is the processor that is assigned to support the thread.

A determination is made as to whether the thread should access a processor's physical local memory (local store) to retrieve data or whether the thread should access a soft copy of the data in a soft copy area (decision 440). For example, if the thread executes on the same processor that includes the data, the thread may access the processor's local store. In another example, a thread may execute on a different processor than the location of the data, in which case the operating system copies the data to a soft copy area such that the thread may access the soft copy, regardless of whether the corresponding processor is inactive.

If the thread should use the physical local memory, decision 440 branches to "Physical" branch 442 whereupon the operating system creates a page table entry in page table 140 (step 450), which includes a real address that is used by an address translator to access data from a processor's local memory, or local store. Page table 140 is the same as that shown in FIG. 1.

Figure 5:
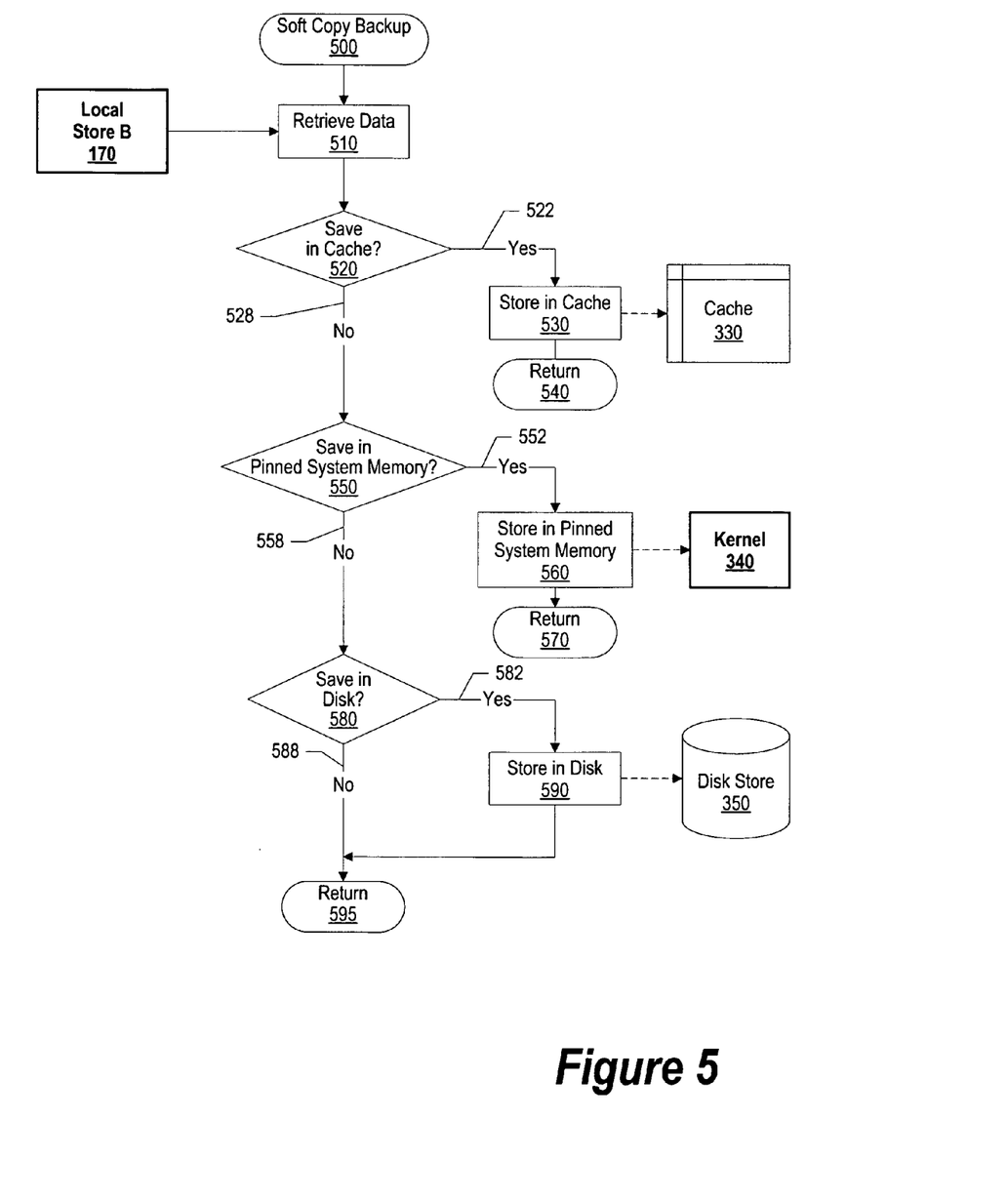
FIG. 5 is a flowchart showing steps taken in copying data that is included in a secondary processor's local memory into a soft copy area.

On the other hand, if the thread should use a soft copy of the local store, decision 440 branches to "Soft Copy" branch 448 whereupon processing copies the data in the local store to a soft copy area (pre-defined process block 460, see FIG. 5 and corresponding text for further details). The operating system creates a page table entry in page table 140 (step 470), which includes a real address that is used by an address translator to access a soft copy of data in a soft copy area. Therefore, when the thread requests data, the address translator accesses a soft copy area in order to provide the data to the thread, regardless of the corresponding processor's state (see FIG. 3 and corresponding text for further details regarding soft copy areas).

The operating system performs memory management by restoring and saving the data into and out of the local store based upon particular policy management. During the memory management process, the operating system may restore data from a soft copy area to a processor's local store, or the operating system may save the data in the local store to a soft copy area (pre-defined process block 480, see FIG. 6 and corresponding text for further details).

A determination is made as to whether the operating system should continue processing thread requests and managing memory (decision 490). If the operating system should continue, decision 490 branches to "Yes" branch 492 which loops back to process more thread requests. This looping continues until the operating system should stop, at which point decision 490 branches to "No" branch 498 whereupon the operating system ends at 499.

FIG. 5 is a flowchart showing steps taken in copying data that is included in a secondary processor's local memory (i.e. local store) into a soft copy area. Processing commences at 500, whereupon processing retrieves data from local store B 170 at step 510. Local store B 170 is the same as that shown in FIG. 1.

A determination is made as to whether to save the data in cache, such as locked L1 cache or locked L2 cache (decision 520). If the operating system should save the data in cache, decision 520 branches to "Yes" branch 522 whereupon processing stores a copy of the data in cache 330 at step 530, and returns at 540. Cache 330 is the same as that shown in FIG. 3. On the other hand, if the operating system should not store the data in cache, decision 520 branches to "No" branch 528 bypassing data storing steps in cache.

A determination is made as to whether to save the data in pinned system memory, such as memory that is reserved within a kernel (decision 550). If the operating system should save the data in pinned system memory, decision 550 branches to "Yes" branch 552 whereupon processing stores a copy of the data in kernel 340 at step 560, and returns at 570. Kernel 340 is the same as that shown in FIG. 3. On the other hand, if the operating system should not store the data in pinned system memory, decision 550 branches to "No" branch 558 bypassing data storing steps in pinned system memory.

A determination is made as to whether to save the data on disk, such as an external hard drive (decision 580). If the operating system should save the data on disk, decision 580 branches to "Yes" branch 582 whereupon processing stores the data in disk store 350 at step 590, and returns at 595. Disk store 350 is the same as that shown in FIG. 3. On the other hand, if the operating system should not store the data on disk, decision 580 branches to "No" branch 588 bypassing data storing steps on disk, and returns at 595.

Figure 6:
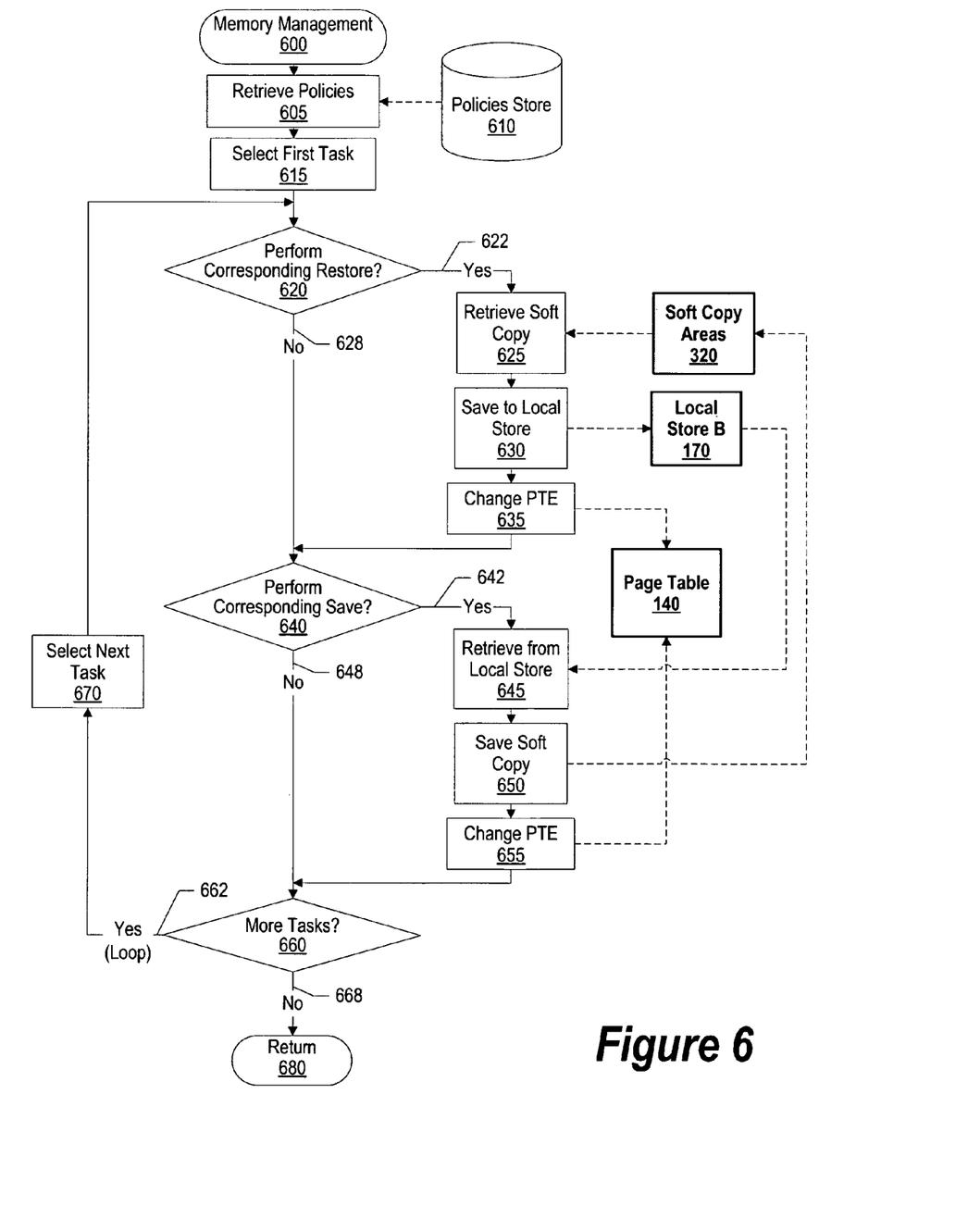
FIG. 6 is a flowchart showing steps taken in restoring and saving data to and from a processor's local store.

FIG. 6 is a flowchart showing steps taken in restoring and saving data to and from a processor's local store (i.e. local memory). An operating system manages a thread's corresponding data by saving and restoring the data based upon particular policies and the state of the corresponding processors. An operating system attempts to provide a thread with the ability to access data in the physical local memory as opposed to accessing a soft copy of the data in a soft copy area. In particular instances, such as when a processor's memory is being utilized by multiple threads, the operating system creates soft copies of the local store whereby the threads utilize the soft copies.

Processing commences at 600, whereupon processing retrieves policies from policies store 610 at step 605. Policies store 610 may be stored on a nonvolatile storage area, such as a computer hard drive. Processing selects a first task at step 615. In one embodiment, processing may select a first thread instead of a first task.

A determination is made as to whether to restore data from a soft copy area to a local store (decision 620). For example, a thread may have been on a low priority and, in the meantime, utilized a soft copy of data in a soft copy area. To continue with this example, the operating system may move the thread to a high priority and the operating system restores the local store with the soft copy and, in turn instructs an address translator to retrieve data from the local store to provide to the thread.

If the operating system wishes to restore data from a soft copy area to a local store, decision 620 branches to "Yes" branch 622 whereupon processing retrieves the soft copy from soft copy area 320 at step 625, and stores the soft copy in local store B 170 (step 630). Soft copy areas 320 and local store B 170 are the same as that shown in FIGS. 3 and 1, respectively. Processing changes a page table entry in page table 140 at step 635 that includes a new real address corresponding to the local store location in which an address translator retrieves data to provide to the thread. During steps 625, 630, and 635, the address translator is "locked" such that local memory B 170 is inaccessible by other threads until the restore operation is complete. On the other hand, if the operating system should not perform a restore operation, decision 620 branches to "No" branch 628 bypassing data restoring steps.

A determination is made as to whether to save data from a local store to a soft copy area (decision 640). For example, a thread may be placed on low priority and, therefore, the operating system instructs an address translator, through a page table entry, to utilize a soft copy of the data.

If the operating system wishes to save data to a soft copy area, decision 640 branches to "Yes" branch 642 whereupon processing retrieves the data from local store B 170 at step 645, and copies the data to soft copy areas 320 (step 650). Soft copy areas 320 may include cache, pinned system memory, or disk (see FIGS. 3, 5, and corresponding text for further details regarding soft copy areas).

Processing changes a page table entry in page table 140 at step 655 that includes a new real address of corresponding to the soft copy area in which an address translator uses to retrieve data for the corresponding thread. During steps 645, 650, and 655, the address translator is "locked" such that local memory B 170 is inaccessible by other threads until the save operation is complete.

A determination is made as to whether there are more tasks to process (decision 660). If there are more tasks to process, decision 660 branches to "Yes" branch 662 which loops back to select (step 670) and process the next task. This looping continues until there are no more tasks to process, at which point decision 660 branches to "No" branch 668 whereupon processing returns at 680.

Figure 7:
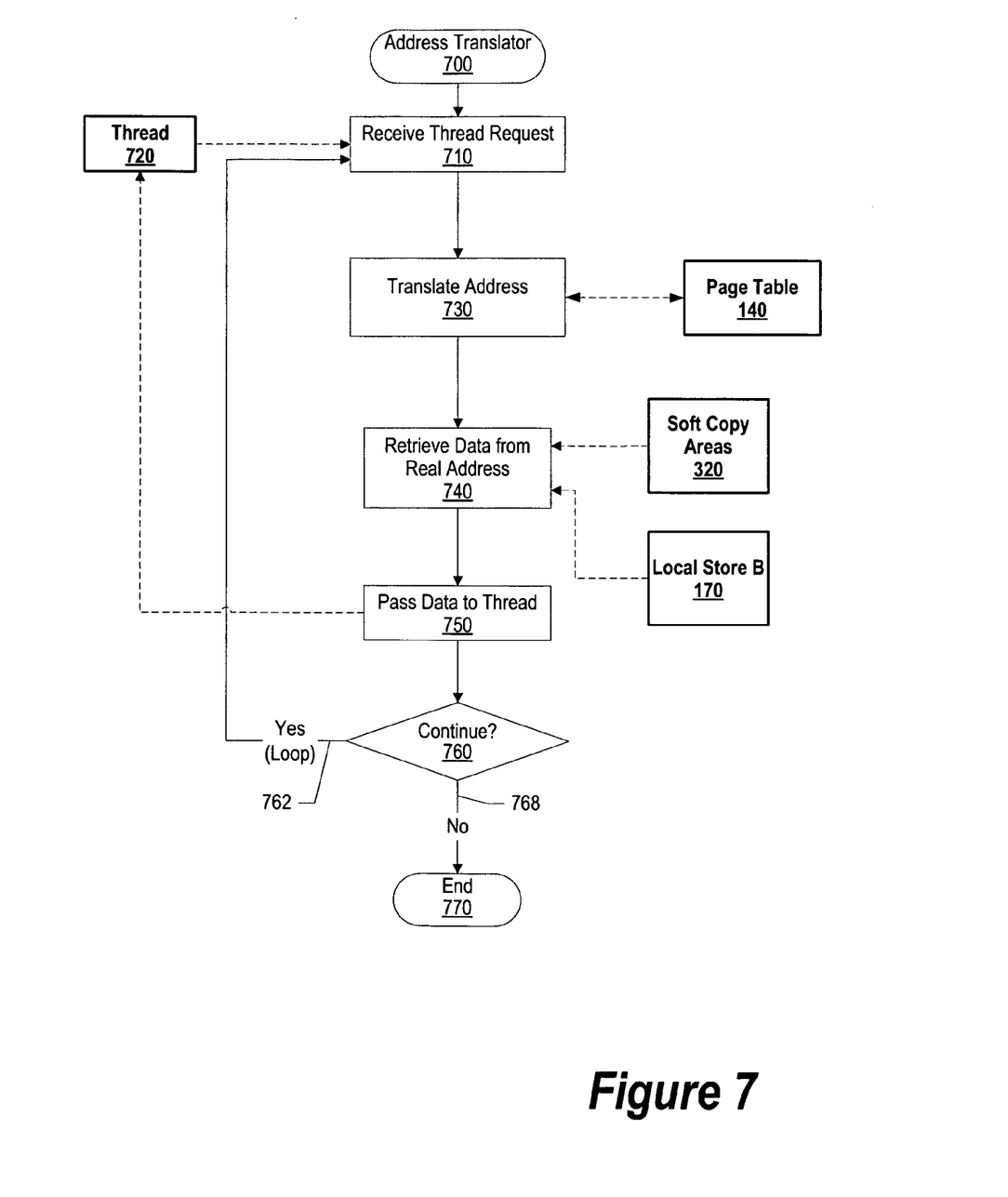
FIG. 7 is a flowchart showing steps taken in translating an address using a page table entry, and providing data to a thread based upon the translated address.

FIG. 7 is a flowchart showing steps taken in translating an address using a page table entry, and providing data to a thread based upon the translated address. Processing commences at 700, whereupon the address translator receives a request from thread 720 at step 710. Thread 720 may be a particular thread, such as thread 1 110, thread 2 200, or thread 3 300 that are shown in FIGS. 1, 2, and 3 respectively. Thread 720 includes an effective address that corresponds to the location of data that thread 720 wishes to access.

At step 730, the address translator accesses page table 140 and translates the effective address to a real address using one of the page table entries. An operating system manages the page table entries such that each page table entry includes a real address that corresponds to either a physical local memory or a soft copy area (see FIG. 6 and corresponding text for further details regarding page table entry management). Page table 140 is the same as that shown in FIG. 1.

The address translator retrieves data from either soft copy areas 320 or local memory B 170 based upon the translated real address (step 740). Soft copy area 320 and local memory B 170 are the same as that shown in FIGS. 3 and 1, respectively. At step 750, processing passes the retrieved data to thread 720. In one embodiment, the address translator incrementally passes data to thread 720, such as one page of data at a time.

A determination is made as to whether the address translator should continue to process thread requests (decision 760). If the address translator should continue to process thread requests, decision 760 branches to "Yes" branch 762 which loops back to process more thread requests. This looping continues until there are no more thread requests to process, at which point decision 760 branches to "No" branch 768 whereupon address translation ends at 770.

Figure 8:
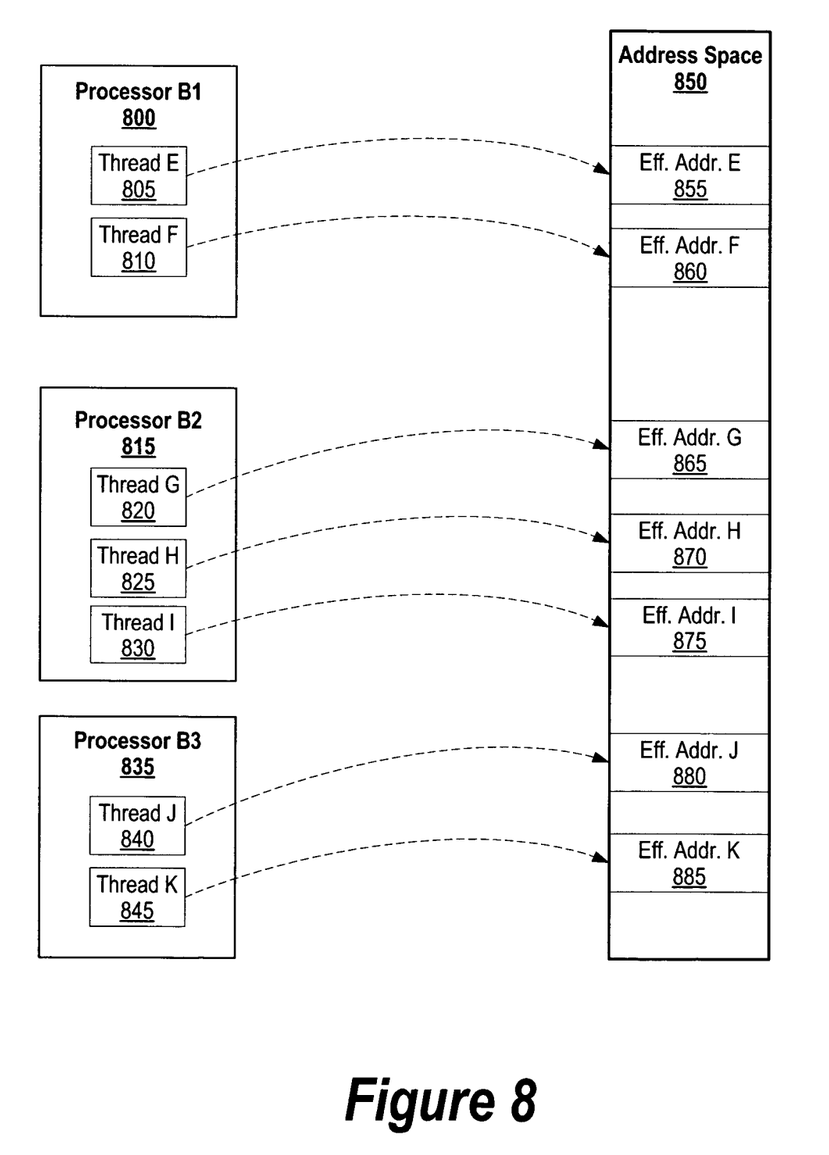
FIG. 8 is a diagram showing a plurality of processors executing a plurality of threads whose addresses are mapped into a common address space.

FIG. 8 is a diagram showing a plurality of processors executing a plurality of threads whose addresses are mapped into a common address space. The present invention allows multiple threads to operate on multiple processors, all the while each thread's respective memory access is managed by an operating system and mapped into an address space, such as address space 850.

Processor B1 800 include thread E 805 and thread F 810. Thread E 805's and thread F 810's effective address space are effective address space E 855 and effective address space F 860, respectively, both of which are included in address space 850. Each thread performs independent operations and, in addition, some threads may be controlled by a first operating system and other threads may be controlled by a second operating system (see FIG. 9 and corresponding text for further details regarding multiple operating systems).

Processor B2 815 includes three threads, which are thread G 820, thread H 825, and thread I 830. As can be seen in FIG. 8, thread G 820's, thread H 825's, and thread I 830's effective address are effective address G 865, effective address H 870, and effective address I 875, respectively, which are located in address space 850.

Lastly, processor B3 860 includes two threads, which are thread J 840 and thread K 845. Thread J 840's and thread K 845's effective address space are effective address space J 880 and effective address space K 885, respectively, which are located in address space 850.

The threads shown in FIG. 8 may be managed such their corresponding processors are "virtual" to an operating system or an application. For example, two operating systems may exist such that one operating system thinks that it is controlling three processors, while the other operating system thinks that it is controlling two processors, all the while there are only three processors in the computer system (see FIG. 9 and corresponding text for further details regarding resource sharing between two operating systems.

Figure 9:
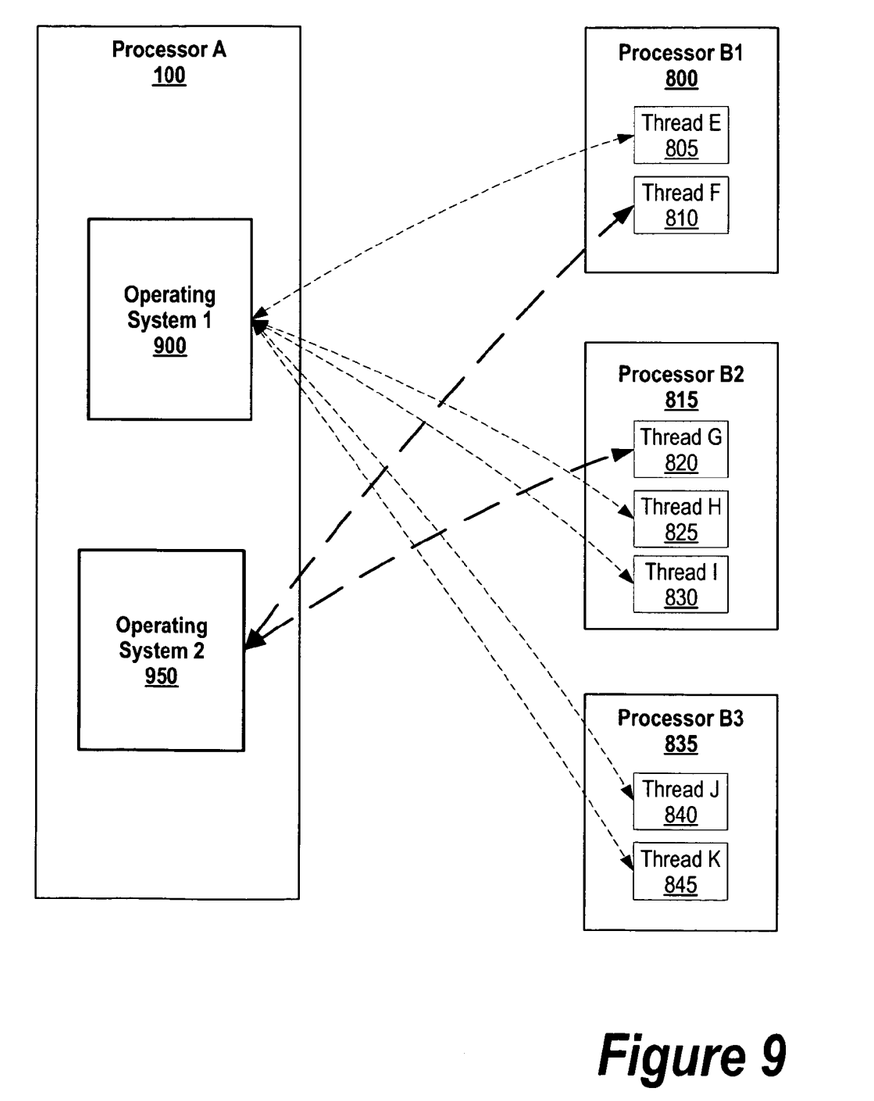
FIG. 9 is a diagram showing two operating systems sharing processor resources in a heterogeneous processor environment.

FIG. 9 is a diagram showing two operating systems sharing processor resources in a heterogeneous processor environment. FIG. 9 shows the use of virtualizing processor local memory in order to share resources between separate operating systems. For example, a computer system may run two operating systems and include eight processors. In this example, the first operating system requires six processors and the second operating system requires all eight processors. In this example, processor resources are virtualized and shared between the two operating systems in order to meet the requirements of both operating systems.

Processor A 100 includes operating system 1 900 and operating system 2 950. Each operating system may be responsible for particular functions. For example, operating system 1 900 may be a real-time operating system for a gaming application and operating system 2 950 may be a virtual operating system that manages web browsing.

FIG. 9 shows processor B1 800, processor B2 815, and processor B3 835 executing multiple threads. Operating system 1 900 utilizes threads E 805, H 825, 1830, J 840, and K 845. As such, operating system 900 thinks that it has control of all three processors (B1 800, B2 815, and B3 835). Processors B1 800, B2 815, and B3 835 are the same as those shown in FIG. 8.

In addition, FIG. 9 shows that operating system 2 950 utilizes threads F 810 and G 820. As such, operating system 950 thinks that it has control of two processors (B1 800 and B2 815). Combined, the operating systems think that there are five processors in the computer system, when in reality there are only three. Threads E 805, F 810, G 820, H 825, 1830, J 840, and K 845 are the same as those shown in FIG. 8.

Each of the threads may access local memory corresponding to one of the other processors using the invention described herein. For example, thread E 805 may access processor B3 835's local memory by sending a request to an address translator to access processor B3 835's local memory. In this example, the address translator identifies a real address corresponding to processor B3 835's local memory using a page table entry that is located in a page table. The real address may correspond to a physical local memory, or the real address may correspond to a soft copy area which includes a soft copy of processor B3 835's data (see FIGS. 1 through 7 and corresponding text for further details regarding address translation).

Figure 10:
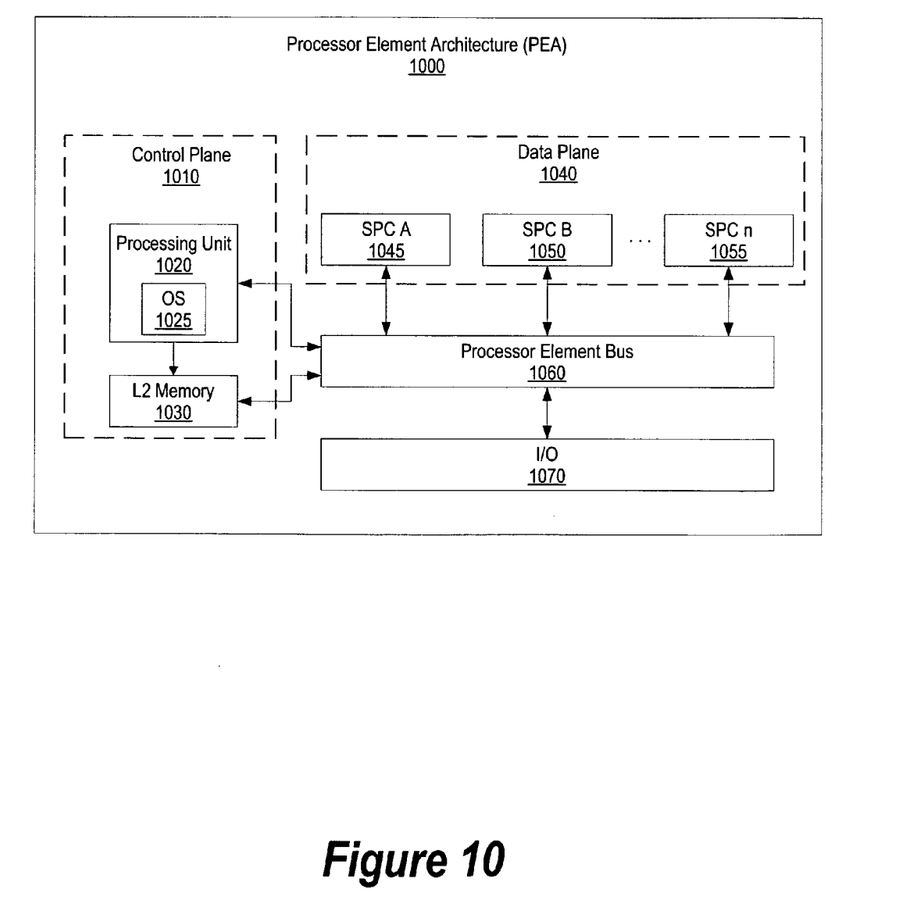
FIG. 10 is a diagram showing a processor element architecture that includes a plurality of heterogeneous processors.

FIG. 10 is a diagram showing a processor element architecture that includes a plurality of heterogeneous processors. The heterogeneous processors share a common memory and a common bus. Processor element architecture (PEA) 1000 sends and receives information to/from external devices through input output 1070, and distributes the information to control plane 1010 and data plane 1040 using processor element bus 1060. Control plane 1010 manages PEA 1000 and distributes work to data plane 1040.

Control plane 1010 includes processing unit 1020 which runs operating system (OS) 1025. For example, processing unit 1020 may be a Power PC core that is embedded in PEA 1000 and OS 1025 may be a Linux operating system. Processing unit 1020 manages a common memory map table for PEA 1000. The memory map table corresponds to memory locations included in PEA 1000, such as L2 memory 1030 as well as non-private memory included in data plane 1040 (see FIG. 11A, 11B, and corresponding text for further details regarding memory mapping).

Data plane 1040 includes Synergistic Processing Complex's (SPC) 1045, 1050, and 1055. Each SPC is used to process data information and each SPC may have different instruction sets. For example, PEA 1000 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU) which is a processing core, such as a digital signal processor, a microcontroller, a microprocessor, or a combination of these cores.

SPC 1045, 1050, and 1055 are connected to processor element bus 1060 which passes information between control plane 1010, data plane 1040, and input/output 1070. Bus 1060 is an on-chip coherent multi-processor bus that passes information between I/O 1070, control plane 1010, and data plane 1040. Input/output 1070 includes flexible input-output logic which dynamically assigns interface pins to input output controllers based upon peripheral devices that are connected to PEA 1000. For example, PEA 1000 may be connected to two peripheral devices, such as peripheral A and peripheral B, whereby each peripheral connects to a particular number of input and output pins on PEA 1000. In this example, the flexible input-output logic is configured to route PEA 1000's external input and output pins that are connected to peripheral A to a first input output controller (i.e. IOC A) and route PEA 1000's external input and output pins that are connected to peripheral B to a second input output controller (i.e. IOC B).

Figure 11A:
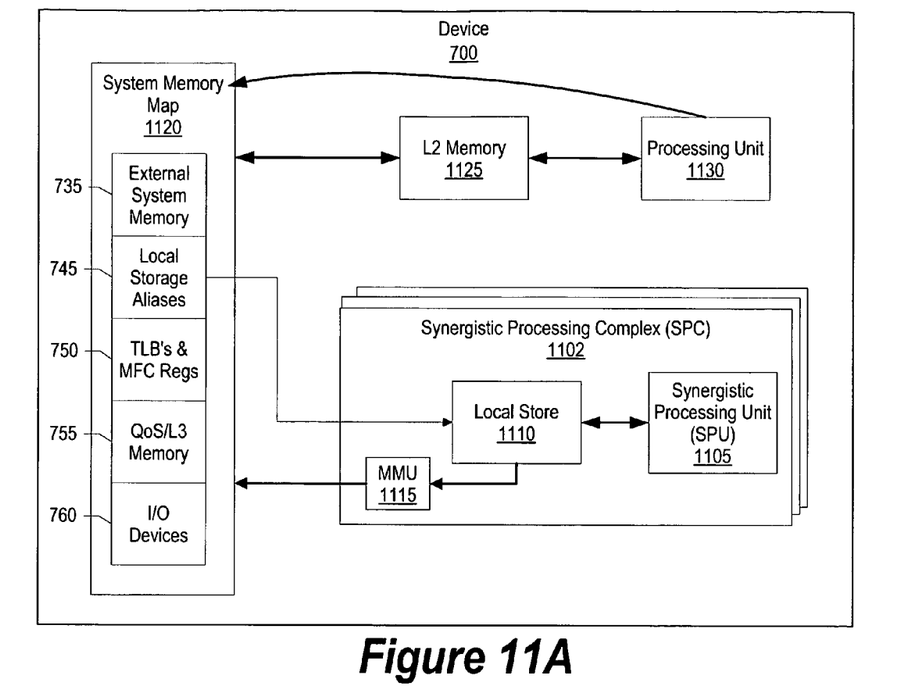
FIG. 11A illustrates an information handling system which is a simplified example of a computer system capable of performing the computing operations described herein.

FIG. 11A illustrates an information handling system which is a simplified example of a computer system capable of performing the computing operations described herein. The example in FIG. 11A shows a plurality of heterogeneous processors using a common memory map in order to share memory between the heterogeneous processors. Device 1100 includes processing unit 1130 which executes an operating system for device 1100. Processing unit 1130 is similar to processing unit 1020 shown in FIG. 10. Processing unit 1130 uses system memory map 1120 to allocate memory space throughout device 1100. For example, processing unit 1130 uses system memory map 1120 to identify and allocate memory areas when processing unit 1130 receives a memory request. Processing unit 1130 access L2 memory 1125 for retrieving application and data information. L2 memory 1125 is similar to L2 memory 1030 shown in FIG. 10.

System memory map 1120 separates memory mapping areas into regions which are regions 1135, 1145, 1150, 1155, and 1160. Region 1135 is a mapping region for external system memory which may be controlled by a separate input output device. Region 1145 is a mapping region for non-private storage locations corresponding to one or more synergistic processing complexes, such as SPC 1102. SPC 1102 is similar to the SPC's shown in FIG. 10, such as SPC A 1045. SPC 1102 includes local memory, such as local store 1110, whereby portions of the local memory may be allocated to the overall system memory for other processors to access. For example, 1 MB of local store 1110 may be allocated to non-private storage whereby it becomes accessible by other heterogeneous processors. In this example, local storage aliases 1145 manages the 1 MB of nonprivate storage located in local store 1110.

Region 1150 is a mapping region for translation lookaside buffer's (TLB's) and memory flow control (MFC registers. A translation lookaside buffer includes cross-references between virtual address and real addresses of recently referenced pages of memory. The memory flow control provides interface functions between the processor and the bus such as DMA control and synchronization.

Region 1155 is a mapping region for the operating system and is pinned system memory with bandwidth and latency guarantees. Region 1160 is a mapping region for input output devices that are external to device 1100 and are defined by system and input output architectures.

Synergistic processing complex (SPC) 1102 includes synergistic processing unit (SPU) 1105, local store 1110, and memory management unit (MMU) 1115. Processing unit 1130 manages SPU 1105 and processes data in response to processing unit 1130's direction. For example SPU 1105 may be a digital signaling processing core, a microprocessor core, a micro controller core, or a combination of these cores. Local store 1110 is a storage area that SPU 1105 configures for a private storage area and a non-private storage area. For example, if SPU 1105 requires a substantial amount of local memory, SPU 1105 may allocate 100% of local store 1110 to private memory. In another example, if SPU 1105 requires a minimal amount of local memory, SPU 1105 may allocate 10% of local store 1110 to private memory and allocate the remaining 90% of local store 1110 to non-private memory (see FIG. 11B and corresponding text for further details regarding local store configuration).

The portions of local store 1110 that are allocated to non-private memory are managed by system memory map 1120 in region 1145. These non-private memory regions may be accessed by other SPU's or by processing unit 1130. MMU 1115 includes a direct memory access (DMA) function and passes information from local store 1110 to other memory locations within device 1100.

Figure 11B:
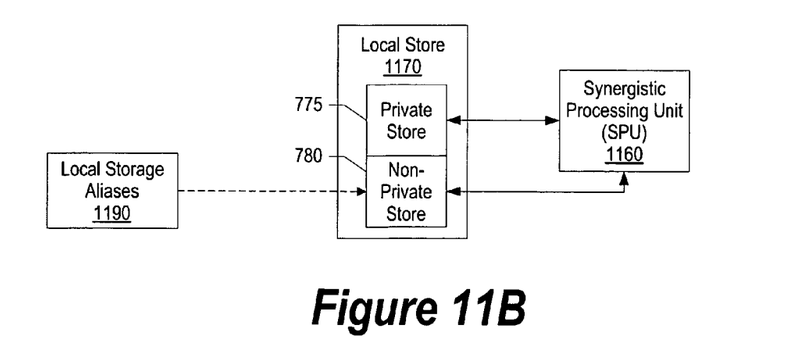
FIG. 11B is a diagram showing a local storage area divided into private memory and non-private memory.

FIG. 11B is a diagram showing a local storage area divided into private memory and non-private memory. During system boot, synergistic processing unit (SPU) 1160 partitions local store 1170 into two regions which are private store 1175 and non-private store 1180. SPU 1160 is similar to SPU 1105 and local store 1170 is similar to local store 1110 that are shown in FIG. 11A. Private store 1175 is accessible by SPU 1160 whereas non-private store 1180 is accessible by SPU 1160 as well as other processing units within a particular device. SPU 1160 uses private store 1175 for fast access to data. For example, SPU 1160 may be responsible for complex computations that require SPU 1160 to quickly access extensive amounts of data that is stored in memory. In this example, SPU 1160 may allocate 100% of local store 1170 to private store 1175 in order to ensure that SPU 1160 has enough local memory to access. In another example, SPU 1160 may not require a large amount of local memory and therefore, may allocate 10% of local store 1170 to private store 1175 and allocate the remaining 90% of local store 1170 to non-private store 1180.

A system memory mapping region, such as local storage aliases 1190, manages portions of local store 1170 that are allocated to non-private storage. Local storage aliases 1190 is similar to local storage aliases 1145 that is shown in FIG. 11A. Local storage aliases 1190 manages non-private storage for each SPU and allows other SPU's to access the non-private storage as well as a device's control processing unit.

While the computer system described in FIGS. 10, 11A, and 11B are capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    receiving a thread request from an operating system executing on a first processor to invoke a thread;
    in response to receiving the thread request, determining a processor state of a second processor, the second processor including data in a local storage accessible by the thread;
    in response to determining that the second processor's state indicates that the thread should access a soft copy of the data, copying the data from the second processor's local storage to a soft copy area, resulting in a soft copy of the data;
    after the copying, receiving a data request from the thread that includes an effective address, wherein the effective address corresponds to the data that is located in the local storage of the second processor;
    translating the effective address to a real address using a page table entry, wherein the real address corresponds to the soft copy area; and
    providing the soft copy of the data located in the soft copy area to the first processor using the real address.

2. The method of claim 1 wherein the soft copy area is selected from the group consisting of a cache, a kernel, and a disk.

3. The method of claim 1 further comprising:
    retrieving one or more policies;
    determining whether to restore the data based upon one or more of the policies; and
    restoring the data in response to the determination, the restoring further comprising:
        retrieving the data from the soft copy area;
        saving the data on the local storage; and
        changing the page table entry corresponding to the restoring.

4. The method of claim 1 wherein the local storage corresponds to registers located on the second processor.

5. The method of claim 1 wherein the first processor is a processing unit and the second processor is a synergistic processing unit.

6. A computer program product stored on a computer memory selected from a group consisting of a random access memory, a hard disk drive and a removable storage, the computer memory containing instructions for execution by a computer, which, when executed by the computer, cause the computer to implement a method of managing data requests, the method comprising:
    receiving a thread request from an operating system executing on a first processor to invoke a thread;
    in response to receiving the thread request, determining a processor state of a second processor, the second processor including data in a local storage accessible by the thread;
    in response to determining that the second processor's state indicates that the thread should access a soft copy of the data, copying the data from the second processor's local storage to a soft copy area, resulting in a soft copy of the data;
    after copying, receiving a data request from the thread that includes an effective address, wherein the effective address corresponds to the data that is located in the local storage of the second processor;
    translating the effective address to a real address using a page table entry, wherein the real address corresponds to the soft copy area; and
    providing the soft copy of the data located in the soft copy area to the first processor using the real address.

7. The program product of claim 6 wherein the soft copy area is selected from the group consisting of a cache, a kernel, and a disk.

8. The program product of claim 6 wherein the method further comprises:
    retrieving one or more policies;
    determining whether to restore the data based upon one or more of the policies; and restoring the data in response to the determination, the restoring further comprising;
retrieving the data from a soft copy area;
saving the data on the local storage; and
changing the page table entry corresponding to the restoring.

9. The program product of claim 6 wherein the local storage corresponds to registers located on the second processor.

10. The program product of claim 6 wherein the first processor is a processing unit and the second processor is a synergistic processing unit.

11. An information handling system comprising:
a display;
a plurality of processors;
one or more nonvolatile storage devices accessible by the plurality of processors;
a shared memory accessible by the plurality of processors; and
a data management tool for providing data to a thread, the data management tool comprising software code effective to:
receive a thread request from an operating system executing on a first processor to invoke a thread;
in response to receiving the thread request, determine a processor state of a second processor, the second processor including data in a local storage accessible by the thread;
in response to determining that the second processor's state indicates that the thread should access a soft copy of the data, copy the data from the second processor's local storage to a soft copy area, resulting in a soft copy of the data;
after the copying, receive a data request from the thread that includes an effective address, wherein the effective address corresponds to the data that is located in the local storage of the second processor, the first processor and the second processor included in the plurality of processors;
translate the effective address to a real address using a page table entry, wherein the real address corresponds to the soft copy area; and
provide the soft copy of the data located in the soft copy area to the first processor using the real address.

12. The information handling system of claim 11 wherein the soft copy area is selected from the group consisting of a cache, a kernel, and a disk.

13. The information handling system of claim 11 wherein the software code is further effective to:
retrieve one or more policies from one of the nonvolatile storage devices;
determine whether to restore the data based upon one or more of the policies; and
restore the data in response to the determination, the software code further effective to:
retrieve the data from a soft copy area included in shared memory;
save the data on the local storage; and
change the page table entry corresponding to the restoring.

14. The information handling system of claim 11 wherein the first processor and the second processor are heterogeneous.

* * * * *